(12) United States Patent
Kim et al.

(10) Patent No.: US 8,804,742 B2
(45) Date of Patent: Aug. 12, 2014

(54) PDCP PACKET TRANSMISSION METHOD

(75) Inventors: Hyeyoung Kim, Anyang-si (KR); Jinseong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 29 days.

(21) Appl. No.: 13/532,659

(22) Filed: Jun. 25, 2012

(65) Prior Publication Data

US 2013/0170496 A1 Jul. 4, 2013

(30) Foreign Application Priority Data

Dec. 29, 2011 (KR) ........................ 10-2011-0146419

(51) Int. Cl.
*H04L 12/28* (2006.01)

(52) U.S. Cl.
USPC ........................................... 370/394

(58) Field of Classification Search
USPC .................. 370/329, 331, 252, 394, 390, 392
See application file for complete search history.

(56) References Cited

U.S. PATENT DOCUMENTS

| | | | | |
|---|---|---|---|---|
| 7,116,667 B2* | 10/2006 | Jiang et al. | ..................... | 370/394 |
| 7,167,475 B2* | 1/2007 | Tourunen et al. | ............. | 370/394 |
| 8,547,914 B2* | 10/2013 | Ryu et al. | ..................... | 370/329 |
| 2009/0168723 A1* | 7/2009 | Meylan | .......................... | 370/331 |
| 2009/0196191 A1* | 8/2009 | Fischer | ......................... | 370/252 |
| 2013/0010705 A1* | 1/2013 | Jonsson et al. | ................. | 370/329 |

\* cited by examiner

*Primary Examiner* — Kwang B Yao
*Assistant Examiner* — Syed M Bokhari
(74) *Attorney, Agent, or Firm* — Lee, Hong, Degerman, Kang & Waimey

(57) ABSTRACT

Disclosed is a PDCP packet transmission method, which improves the transmission performance of UE and eNB by suggesting a method for preventing data loss at the application end, caused by an invalid deciphering result which is generated when 2048 or more PDCP SDUs with sequence numbers assigned thereto are discarded, and a wireless transmission/reception unit (WTRU) including a PDCP entity. The method for transmitting PDCP packet, includes the steps of: receiving a PDCP SDU from an upper layer; determining whether or not sequence numbers are assigned to less than a predetermined number of PDCP SDUs subsequent to the last PDCP PDU completely and successfully transmitted from a lower layer; and if sequence numbers are assigned to less than the predetermined number of PDCP SDUs, assigning a sequence number to the PDCP SDU received from the upper layer.

10 Claims, 15 Drawing Sheets

PDCP PACKET TRANSMISSION METHOD

CROSS-REFERENCE TO RELATED APPLICATION

Pursuant to 35 U.S.C. §119(a), this application claims the benefit of earlier filing date and right of priority to Korean Application No. 10-2011-0146419, filed on Dec. 29, 2011, the contents of which is incorporated by reference herein in its entirety.

TECHNICAL FIELD

The present invention relates to mobile communication, and more particularly, to a PDCP packet transmission method.

BACKGROUND ART

Second-generation mobile communication refers to the transmission and reception of voice in a digital form, such as CDMA, GSM, and the likes. GPRS, which is more advanced than the GSM, has been proposed, and the GPRS is a technology to provide a packet switched data service based upon the GSM system.

Third-generation mobile communication refers to the transmission and reception of video and data as well as voice, and 3GPP (Third Generation Partnership Project) developed a mobile communication system (IMT-2000) technology, and adopted WCDMA as a radio access technology (hereinafter, referred to as "RAT"). By combining both of such an IMT-2000 technology and a radio access technology (RAT), e.g., WCDMA, it is called UMTS (Universal Mobile Telecommunication System) in Europe. Furthermore, the term UTRAN is an abbreviation of UMTS Terrestrial Radio Access Network.

Fourth-generation mobile communication is the fourth generation of wireless mobile communications standards. It is a successor of 2G and 3G families of standards. A 4G system is expected to provide a comprehensive and secure all-IP based solution where facilities such as ultra-broadband (giga-bit speed such as 1000+ MiB/s) Internet access, IP telephony, gaming services, and streamed multimedia may be provided to users. LTE (Long Term Evolution) is one of the 4th generation wireless standards designed to increase the capacity and speed of mobile telephone networks. E-UTRAN is the air interface of an LTE upgrade path for mobile networks. It is the abbreviation for evolved UMTS Terrestrial Radio Access Network.

In LTE, when the ciphering function is activated, transmitted data, which is ciphered using a COUNT value generated by a transmitting side PDCP, is deciphered using a COUNT value expected by a receiving side PDCP. According to 3GPP LTE PDCP spec (TS36, 323), a COUNT value includes a PDCP SN and an HFN, and the receiving side generates a COUNT value using a received PDCP SN and an expected HFN value. However, if the channel status is not good, a state of not receiving sufficient grants from an eNB may continue, and this may cause the discarding of a large amount of PDCP SDUs from the transmitting side when the Discard Timer is activated. In the case of using an ciphering algorithm other than Null, if 2048 or more PDCP SDUs with sequence numbers (SNs) assigned thereto are discarded, the HFN value used by the transmitting side and the HFN value used by the receiving side are different from each other, which is an invalid deciphering result, and therefore data loss may occur at the application end. At present, any method for preventing or restoring this is not mentioned in the 3GPP LTE PDCP spec.

DISCLOSURE OF THE INVENTION

Therefore, an object of the present invention is to improve the transmission performance of UE and eNB by suggesting a method for preventing data loss at the application end, caused by an invalid deciphering result which is generated when 2048 or more PDCP SDUs with sequence numbers assigned thereto are discarded.

To achieve these and other advantages and in accordance with the purpose of the present invention, as embodied and broadly described herein, there is provided a method for transmitting a PDCP packet according to an embodiment of the present invention, the method including receiving a PDCP SDU from an upper layer; determining whether or not sequence numbers are assigned to less than a predetermined number of PDCP SDUs subsequent to the last PDCP PDU completely and successfully transmitted from a lower layer; and if sequence numbers are assigned to less than the predetermined number of PDCP SDUs, assigning a sequence number to the PDCP SDU received from the upper layer.

In one embodiment, the method further includes: if sequence numbers are assigned to the predetermined number of PDCP SDUs, assigning a sequence number, next to the one assigned to the last PDP PDU transmitted from the lower layer but not received acknowledgement, to the PDCP SDU received from the upper layer.

In one embodiment, the determining step includes determining whether the difference between the sequence number assigned to the next PDCP SDU and the sequence number assigned to the last PDCP PDU completely and successfully transmitted from the lower layer is less than the predetermined number or not.

In one embodiment, the predetermined number is based on the size of a reordering window.

In one embodiment, the predetermined number is 2047.

In one embodiment, the method further includes if sequence numbers are assigned to the predetermined number of or more PDCP SDUs, returning to the determining step.

In one embodiment, the assigning step includes assigning the sequence to be assigned to the next PDCP SDU to the PDCP SDU received from the upper layer.

In one embodiment, the receiving step, the determining step, and the assigning step are implemented by a PDCP entity.

There is provided a wireless transmission/reception unit (WTRU) including a PDCP entity according to another embodiment of the present invention, the wireless transmission/reception unit including: a transmission standby buffer configured to store a PDCP SDU received from an upper layer; a transmission buffer configured to store a PDCP PDU subsequent to the last PDCP PDU completely and successfully transmitted a lower layer; and a controller configured to determine whether or not sequence numbers are assigned to less than a predetermined number of PDCP SDUs subsequent to the last PDCP PDU completely and successfully transmitted from the lower layer, and if sequence numbers are assigned to less than the predetermined number of PDCP SDUs, assign a sequence number to the PDCP SDU stored in the transmission standby buffer.

In another embodiment, if sequence numbers are assigned to the predetermined number of PDCP SDUs, the control unit assigns a sequence number, next to the one assigned to the last PDP PDU transmitted from the lower layer but not received acknowledgement, to the PDCP SDU received from the upper layer.

In another embodiment, the control unit determines whether or not the difference between the sequence number assigned to the next PDCP SDU and the sequence number assigned to the last PDCP PDU completely and successfully transmitted from the lower layer is less than the predetermined number.

In one embodiment, the predetermined number is based on the size of a reordering window.

MODES FOR CARRYING OUT THE PREFERRED EMBODIMENTS

Figure 1:
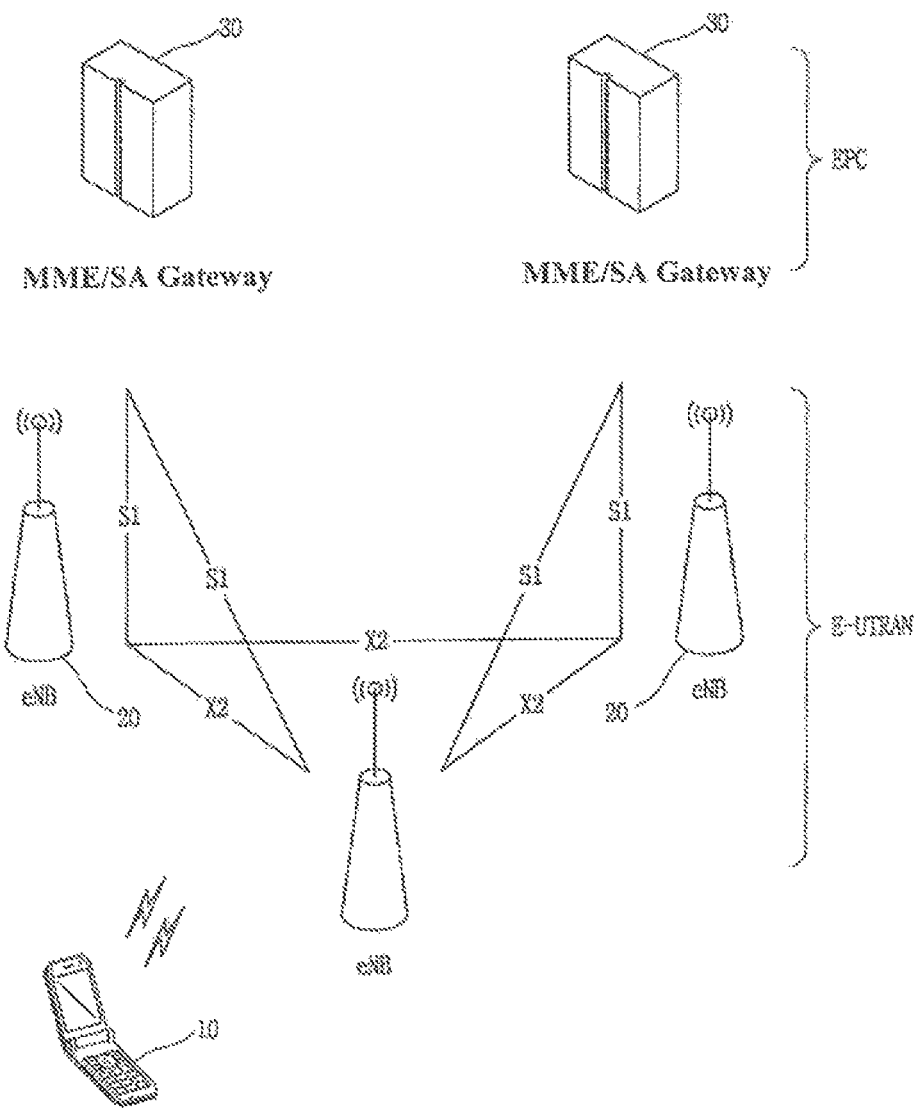
FIG. 1 illustrates a network structure of an E-UMTS (LTE)

The features described herein can be applied to the so-called LTE (Long Term Evolution) technologies, which are being developed after 3G mobile communications in anticipation of rapidly increasing data traffic. Such is one aspect of developing an evolved network that can support greater bandwidth, and the term E-UTRAN (Evolved UTRAN) is being used.

However, the features and characteristics described herein are not meant to be limited to LTE, but can also be adapted, applied and implemented in various other communication systems and methods, such as GSM, GPRS, CDMA, CDMA2000, WCDMA, IEEE 802.xx, UMTS, etc.

Hereafter, the term 'mobile terminal' is used, but can also be referred to US (User Equipment), ME (Mobile Equipment), MS (Mobile Station), and the like. Also, a mobile terminal can include highly portable devices having communication functions, such as a portable phone, a PDA, a Smart Phone, a notebook/laptop computer, etc., as well as less portable devices, such as personal computers (PC), vehicle mounted devices, and the like.

The technical terms and phrases used herein are used to describe features in particular embodiments, and are not meant to limit the concepts of the present invention. Also, if a technical term herein is not specifically defined in a different manner, such will be interpreted to have the meaning that one of ordinary skill in the art would understand, without an excessively broad or excessively narrow interpretation. If any terms herein have been erroneously used or not completely technically accurate, then such terms may be clarified or interpreted as those skilled in the art would deem appropriate. Also, certain general terms used herein shall be interpreted according to their dictionary meaning, or interpreted in view of the context without being construed too narrowly.

Also, any words or phrases used herein in the singular may be interpreted to cover their plurality, unless clearly described to the contrary. The word "including" or "comprising" or the like should not be interpreted to mean that the various elements or steps always need to be present. Some elements or steps may not need to be present, or additional elements or steps may also be present.

The words "first" or "second" or other terms that connote an order or sequence may be used to describe various different elements or steps to provide distinguishing therebetween, unless specified that the numerical order is of some significance. For example, without exceeding the scope of the present invention, a first element can also be explained as a second element, while a second element can also be explained as a first element.

For any description about one element being "connected to" or "connected with" or the like, with respect to another element, a direct connection may be possible or an intermediate element may exist between the two elements. On the other hand, if two elements are described to be "directly" connected together, this may mean that no other elements exists therebetween.

Hereafter, with reference to the attached drawings, some embodiments will be explained, and regardless of the reference numbers in the drawings, some elements may be labeled with the same reference numbers and any repetitive explanations may have been omitted merely for the sake of brevity. Also, certain aspects of the related or conventional art, which may be a basis for the present invention, may have not been explained but could be understood by those skilled in the art. The features shown in the attached drawings are merely depicted to improve the understanding of the present invention and should not be interpreted to limit the teachings of the present invention. As such, various modifications, changes, equivalents and replacements are part of the inventive features described throughout this description.

FIG. 1 illustrates a network structure of an E-UMTS (LTE). The E-UMTS (LTE) is also referred to as an LTE system. The communication network is widely deployed to provide a variety of communication services such as voice and packet data.

Referring to FIG. 1, the E-UMTS (LTE) network includes an Evolved Universal Terrestrial Radio Access Network (E-UTRAN), an Evolved Packet Core (EPC), and one or more User Equipments (UEs). The E-UTRAN may include one or more evolved NodeBs (eNBs) 20, and a plurality of UEs 10 may be located in one cell. One or more E-UTRAN Mobility Management Entity/System Architecture Evolution (MME/SAE) gateways 30 may be positioned at the end of the network and may be connected to an external network. In this specification, downlink refers to communication from the eNB 20 to the UE 10, and uplink refers to communication from the UE to an eNB.

The UE 10 is communication equipment carried by a user and may also be referred to as a Mobile Station (MS), a User Terminal (UT), a Subscriber Station (SS), or a wireless device. The eNB 20 is generally a fixed station communicating with the UE 10 and may also be referred to as an Access Point (AP). The eNB 20 provides end points of a user plane and a control plane to the UE 10. One eNB 20 may be deployed per cell. An interface for transmitting user traffic or control traffic may be used between the eNBs 20. The MME/SAE gateway 30 provides an end point of a session and mobility management function to the UE 10. The eNB 20 and MME/SAE gateway 30 may be connected via a S1 interface.

The MME provides various functions, including distribution of paging messages to the eNBs 20, security control, idle state mobility control, SAE bearer control, and ciphering and integrity protection of Non-Access Stratum (NAS) signaling. An SAE gateway host provides a variety of functions, including termination of a plane packet and user plane switching for supporting mobility of the UE 10. The MME/SAE gateway 30 will be referred to herein simply as a "gateway". However, the MME/SAE gateway 30 includes both an MME and an SAE gateway.

Figure 2:
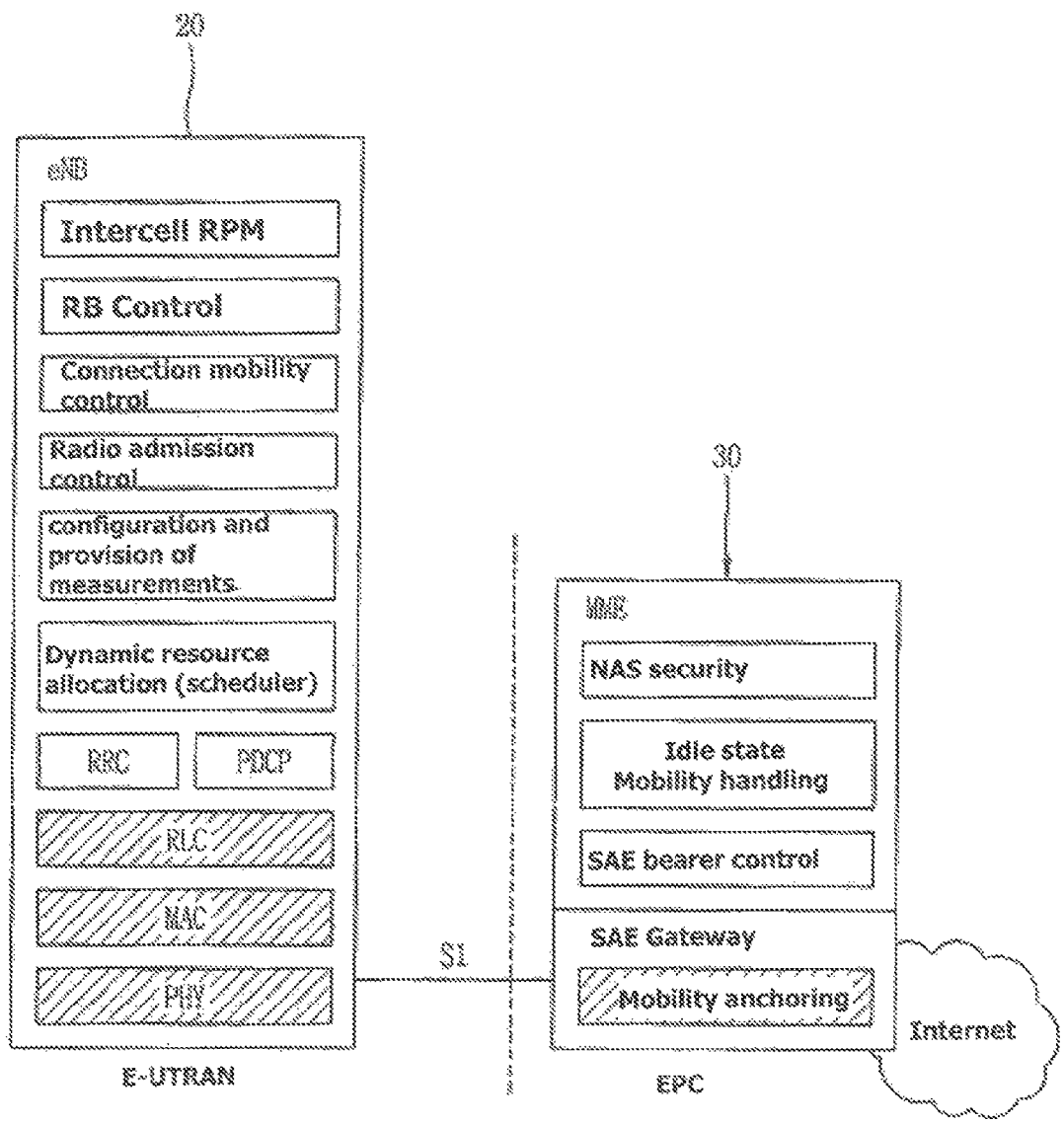
FIG. 2 illustrates the architecture of a typical E-UTRAN and a typical gateway 30.

FIG. 2 illustrates the architecture of a typical E-UTRAN and a typical gateway 30. Referring to FIG. 2, the eNB 20 may perform functions such as selection for the gateway 30, routing toward the gateway during a Radio Resource Control (RRC) activation, scheduling and transmitting paging messages, scheduling and transmitting Broadcast Channel (BCCH) information, dynamic resource allocation to the UEs 10 in both uplink (UL) and downlink (DL), configuration and provision of eNB measurements, Radio Bearer (RB) control, Radio Admission Control (RAC), and connection mobility control in an LTE_ACTIVE state. The gateway 30 may perform functions such as paging origination, LTE_IDLE state handling, user plane ciphering, SAE bearer control, and ciphering and integrity protection of NAS signaling.

Figure 3:
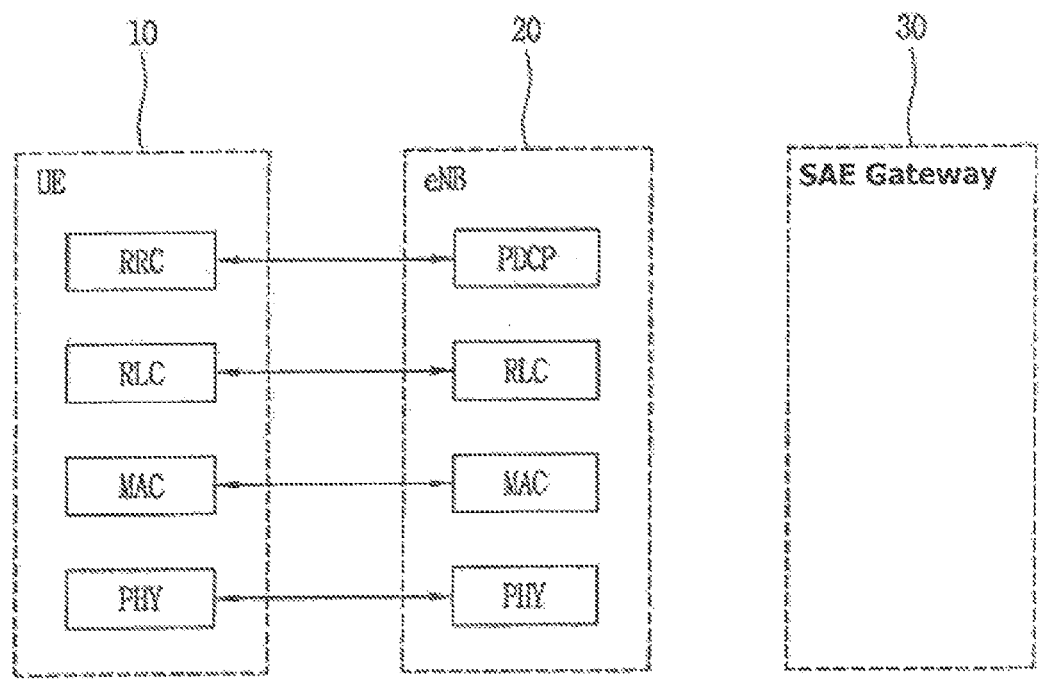
FIG. 3 and FIG. 4 illustrate user-plane and control-plane protocol stacks for an E-UMTS (LTE)
Figure 4:
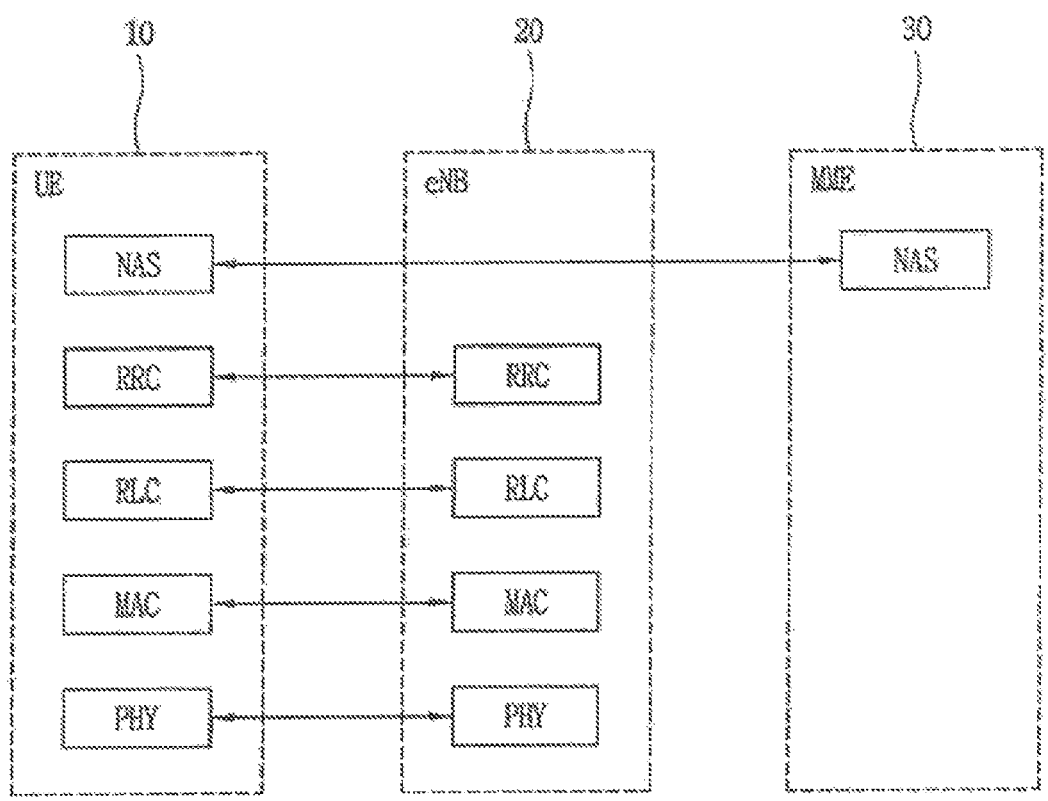

FIG. 3 and FIG. 4 illustrate user-plane and control-plane protocol stacks for an E-UMTS (LTE). Referring to FIG. 3 and FIG. 4, protocol layers may be divided into a first layer (L1), a second layer (L2) and a third layer (L3) based upon three lower layers of an Open System Interconnection (OSI) standard model that is well-known in the art of communication systems.

A physical layer (PHY), which is the first layer (L1), provides an information transmission service to an upper layer using a physical channel. The physical layer is connected to a Medium Access Control (MAC) layer located at an upper level through a transport channel. Data is transferred between the MAC layer and the physical layer via the transport channel. Data is also transferred via a physical channel between a physical layer of a transmission side and a physical layer of a reception side.

A MAC layer of the second layer (L2) provides services to a Radio Link Control (RLC) layer of an upper layer via a logical channel. The RLC layer of the second layer (L2) supports reliable data transmission. If the MAC layer performs an RLC function, the RLC layer is included in a functional block of the MAC layer. A Packet Data Convergence Protocol (PDCP) layer of the second layer (L2) performs a header compression function. The header compression function allows efficient transmission of Internet protocol (IP) packet, such as an IPv4 or IPv6 packet through a radio interface that has a relatively narrow bandwidth.

A radio resource control (RRC) layer located at the lowest portion of the third layer (L3) is defined only in the control plane and controls logical channels, transport channels and the physical channels in relation to the configuration, reconfiguration, and release of radio bearers (RBs). An RB refers to a service provided by the second layer (L2) for data transmission between the UE 10 and the E-UTRAN.

Referring to FIG. 3, the RLC and MAC layers are terminated in an eNB 20 and may perform functions such as scheduling, Automatic Repeat Request (ARQ), and Hybrid Automatic Repeat Request (HARQ). The PDCP layer is terminated in the eNB 20 and may perform functions such as header compression, integrity protection, and ciphering.

Referring to FIG. 4, the RLC and MAC layers are terminated in the eNB 20 and perform the same functions as in the control plane. As illustrated in FIG. 3, the RRC layer is terminated in the eNB 20 and may perform functions such as broadcasting, paging, RRC connection management, RB control, mobility function, and UE measurement reporting and control. As illustrated in FIG. 2, a NAS control protocol is terminated in an MME of a gateway 30 and may perform functions such as an SAE bearer management, authentication, LTE_IDLE mobility handling, paging origination in an LTE_IDLE state, and security control for signaling between the gateway and the UE 10.

The NAS control protocol may use three different states. An LTE-DETACHED is used when there is no RRC entity. An LTE_IDLE state is used when there is no RRC connection while storing minimal information about the UE 10. An LTE_ACTIVE state is used when an RRC state is established. The RRC state may further be divided into RRC_IDLE and RRC_CONNECTED.

In an RRC_IDLE state, the UE 10 performs Discontinuous Reception (DRX) set by the NAS using an ID which is uniquely allocated in a tracking area. In other words, the UE 10 may receive broadcasts of system information and paging information by monitoring paging signals at a specific paging occasion of every UE-specific paging DRX cycle. No RRC context is stored in the eNB in the RRC-IDLE state.

In an RRC_CONNECTED state, it is possible for the UE 10 to transmit and/or receive data to/from the eNB using an E-UTRAN RRC connection and a context in the E-UTRAN. Furthermore, the UE 10 can report channel quality information and feedback information to the eNB. In the RRC_CONNECTED state, the E-UTRAN knows a cell to which the UE 10 belongs. Therefore, the network may transmit and/or receive data to/from the UE 10, control mobility such as handover of the UE, and perform cell measurements for a neighboring cell.

Figure 5:
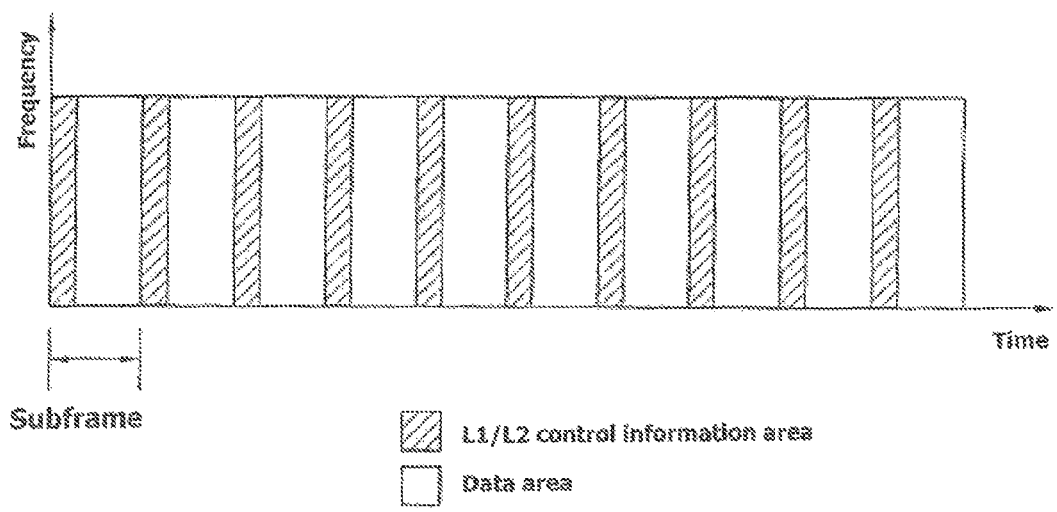
FIG. 5 illustrates a radio frame structure used in an E-UMTS (LTE) system.

FIG. 5 illustrates a radio frame structure used in an E-UMTS (LTE) system.

Referring to FIG. 5, the E-UMTS (LTE) system uses a 10 ms radio frame and one radio frame includes 10 subframes. One subframe includes two consecutive slots, each of which has a length of 0.5 ms. In addition, one subframe includes a plurality of symbols (e.g. OFDM symbols and SC-FDMA symbols). One subframe includes a plurality of resource blocks, each of which includes a plurality of symbols and a plurality of subcarriers. Some (e.g. the first symbol) of the plurality of symbols constituting the subframe may be used to transmit L1/L2 control information. A physical channel (e.g. Physical Downlink Control Channel (PDCCH)) for transmitting the L1/L2 control information includes multiple subframes on a time axis and multiple subcarriers on a frequency axis.

Hereinafter, the PDCP layer will be described in detail with reference to FIG. 6.

Figure 6:
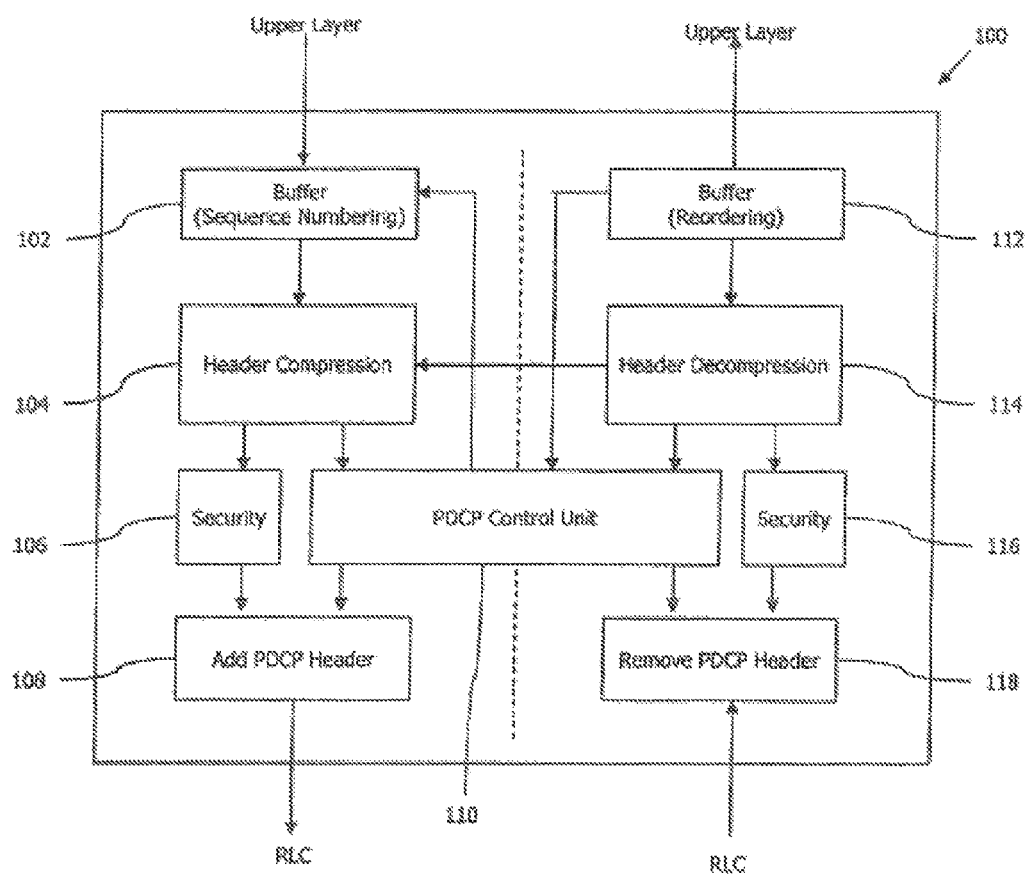
FIG. 6 is an exemplary view showing the structure of a PDCP entity of the PDCP layer of FIG. 2.

FIG. 6 is an exemplary view showing the structure of a PDCP entity of the PDCP layer of FIG. 2.

The PDCP entity shown in FIG. 6 is upwardly connected to the RRC layer or a user application, and downwardly connected to the RLC layer.

This PDCP entity 100 consists of a transmitting side and a receiving side.

The left side depicts the transmitting side having a buffer 102, a header compressor 104, a security handling unit 106, and a PDCP header attachment unit 108, while the right side depicts the receiving side having a PDCP header removal unit 118, a security handling unit 116, a header decompressor 114, and a buffer 112. Such transmitting side and receiving side share a PDCP control unit 110.

The transmitting side PDCP entity forms PDUs (Protocol Data Units) using SDUs (Service Data Units) received from the upper layer or using control information that was generated by the PDCP entity itself and then transmits such PDUs to a peer PDCP entity (i.e. a PDCP entity within the RNS) at the receiving side. This PDCP entity at the receiving side converts the received PDCP PDUs into PDCP SDUs or extracts control information from the received PDCP PDUs.

It should be noted that the functional blocks shown in FIG. 6 can be implemented in many different ways as could be understood by those skilled in the art.

As mentioned previously, the PDUs generated by the PDCP entity 100 at the transmitting side can be distinguished as Data PDUs and Control PDUs.

The PDCP Data PDU is a data block that is made at the PDCP entity by processing the SDU received from an upper layer. The PDCP Control PDU is a data block that the PDCP entity itself generates in order to transfer control information to a peer PDCP entity.

The PDCP Data PDU is generated for the radio bearer (RB) of both the user plane (U-plane) and of the control plane (C-plane), and some of the PDCP functions are selectively applied to the user plane.

Namely, the function of the header compressor 104 is applied only for the U-plane data, and the integrity protection function among the functions of the security handling unit 106 is applied only for the C-plane data. In addition to the integrity protection function, the security handling unit also has a ciphering function that maintains data security, and such ciphering function applies to both U-plane data and C-plane data.

The PDCP Control PDU is generated only by the radio bearer (RB) of the U-plane, and there are two types: (1) a PDCP status report message (i.e. PDCP STATUS REPORT message) used to inform the transmitting side about the PDCP entity reception buffer status and (2) a Header Compression Feedback Packet used to inform about the status of the header decompressor 114 to the header compressor 104 of the transmitting side.

The PDCP status report message (PDCP STATUS REPORT message) is transmitted from the receiver PDCP to the transmitter PDCP in order to inform the transmitter PDCP about the PDCP PDUs that were received or not received by the receiver PDCP, such that received PDCP SDUs do not have to be retransmitted and non-received PDCP SDUs can be retransmitted. This PDCP status report message can be send in the form of a PDCP STATUS PDU, and its exemplary structure is shown in FIG. 4.

According to an embodiment disclosed in this specification, the buffer 102 may include a transmission standby buffer (not shown) that stores a PDCP SDU received from an upper layer and a transmission buffer (not shown) that stores PDCP PDUs subsequent to the last PDCP PDU completely and successfully transmitted from a lower layer.

Figure 7:
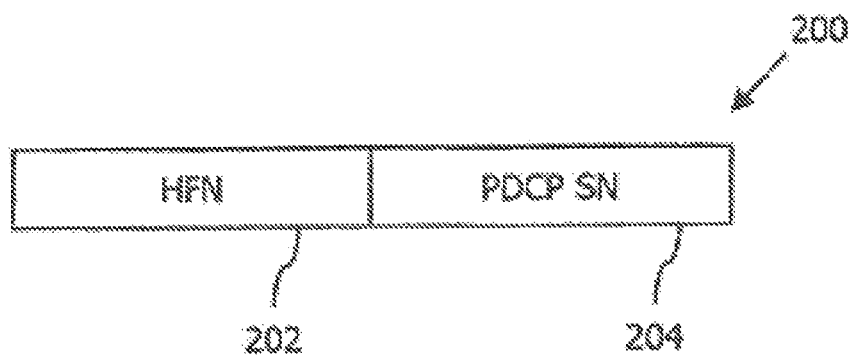
FIG. 7 is a view showing the format of a COUNT value according to an embodiment disclosed in this specification.

FIG. 7 is a view showing the format of a COUNT value according to an embodiment disclosed in this specification.

The PDP entity 100 maintains a COUNT value for ciphering and integrity. That is, inputs required for the ciphering function each includes a COUNT value. As illustrated in Table 200, the COUNT value consists of an HFN 202 and a PDCP SN 204. The length of the PDCP SN is configured by upper layers. The size of the HFN 204 is equal to 32 minus the length of the PDCP SN 204.

Figure 8:
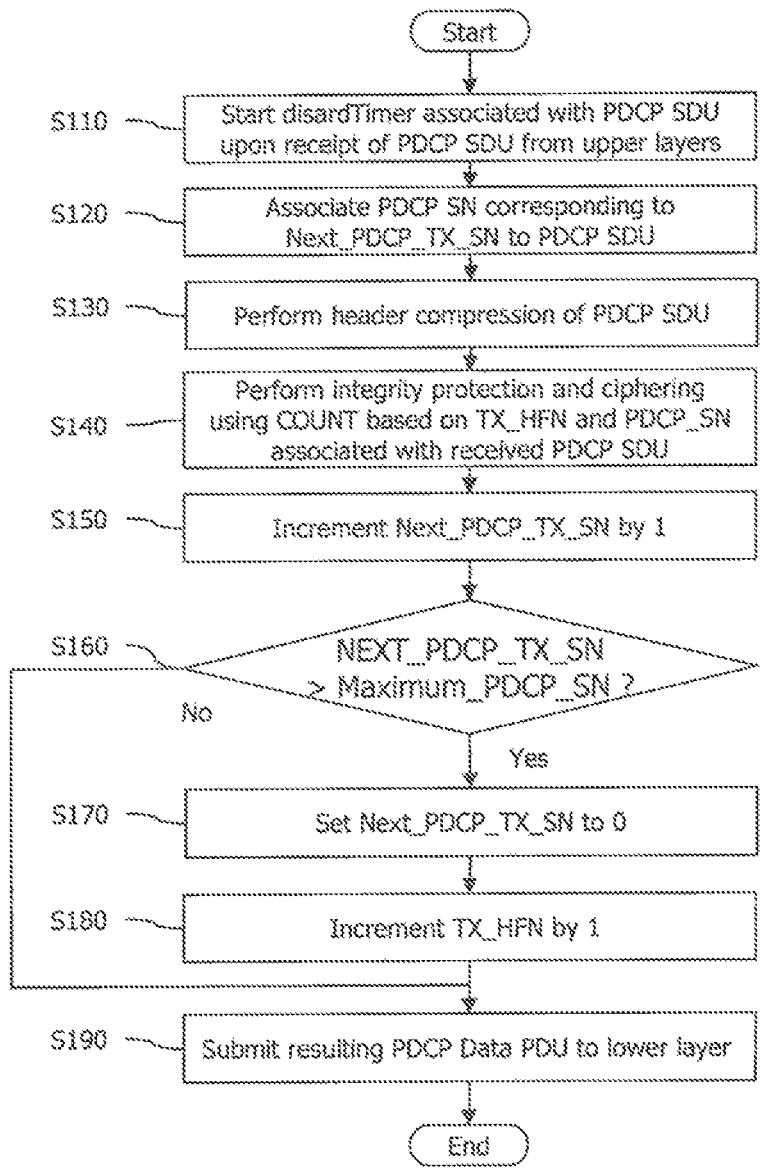
FIG. 8 is a flowchart showing a process for the transmitting side PDCP entity to transmit user data according to an embodiment disclosed in this specification.

FIG. 8 is a flowchart showing a process for the transmitting side PDCP entity to transmit user data according to an embodiment disclosed in this specification.

Upon reception of a PDCP SDU from upper layers, the UE 10 shall start the Discard Timer associated with the received PDCP SDU if configured (S110). When the Discard Timer expires for a PDCP SDU, or the successful delivery of a PDCP SDU is confirmed by PDCP status report, the UE 10 shall discard the PDCP SDU along with the corresponding PDCP PDU. If the corresponding PDCP PDU has already been submitted to lower layers, the discard is indicated to lower layers.

The UE 100 shall perform the following process for the PDCP SDUs received from upper layers.

Hereinbelow, Next_PDCP_TX_SN indicates the PDCP SN of the next PDCP SDU for a given PDCP entity. At establishment of the PDCP entity, Next_PDCP_TX_SN is set to 0. TX_HFN indicates the HFN value for the generation of the COUNT value used for PDCP PDUs for a given PDCP entity. At establishment of the PDCP entity, TX_HFN is set to 0.

The UE 10 shall associate the PDCP SN corresponding to Next_PDCP_TX_SN to this PDCP SDU (S120). Then, the UE 10 shall perform header compression of the PDCP SDU if configured (S130). Then, the UE 10 shall perform integrity protection (if applicable), and ciphering (if applicable) using COUNT based on TX_HFN and the PDCP SN associated with the received PDCP SDU (S140).

The UE 10 shall increment Next_PDCP_TX_SN by 1 (S150). If Next_PDCP_TX_SN is greater than Maximum_PDCP_SN in the step S160, the UE 10 shall set Next_PDCP_TX_SN to 0 (S170), and increment TX_HFN by 1 (S180). Then, the UE 100 shall submit the resulting PDCP Data PDU to lower layers (S190).

Figure 9:
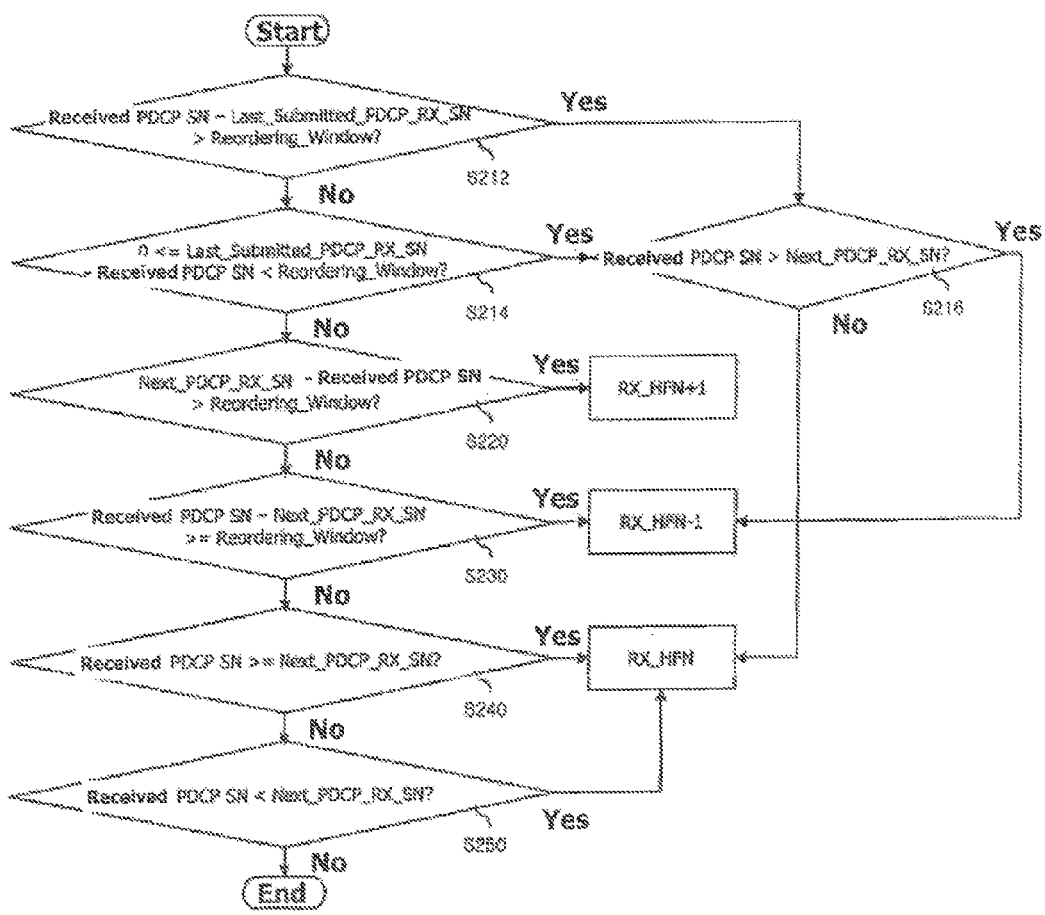
FIG. 9 is a flowchart schematically showing a process for the receiving side PDCP entity to receive user data according to an embodiment disclosed in this specification.

FIG. 9 is a flowchart schematically showing a process for the receiving side PDCP entity to receive user data according to an embodiment disclosed in this specification.

The receiving side PDCP entity deciphers a PDCP SDU. As previously described, the receiving side PDCP entity uses an expected COUNT value to perform deciphering, so it is important to determine a COUNT value, especially, an HFN value, for deciphering. The receiving side PDCP entity may determine an HFN value for deciphering in accordance with the received PDCP SN, Last_Submitted_PDCP_RX_SN, and Next_PDCP_RX_SN.

In what follows, Next_PDCP_RX_SN indicates the next expected PDCP SN by the receiver for a given PDCP entity. At establishment of the PDCP entity, the UE 10 shall set Next_PDCP_RX_SN to 0. RX_HFN indicates the HFN value for the generation of the COUNT value used for the received PDCP PDUs for a given PDCP entity. At establishment of the PDCP entity, the UE 10 shall set RX_HFN to 0.

For PDCP entities mapped on RLC AM, Last_Submitted_PDCP_RX_SN indicates the SN of the last PDCP SDU delivered to the upper layers. At establishment of the PDCP entity, the UE 100 shall set Last_Submitted_PDCP_RX_SN to 4095.

Reordering_Window indicates the size of the reordering window. The size equals to 2048, i.e. half of the PDCP SN space, for radio bearers that are mapped on RLC AM. Maximum_PDCP_SN indicates the maximum value of a PDCP SN. Maximum_PDCP_SN is 4095 if the PDCP entity is configured for the use of 12 bit SNs, 127 if the PDCP entity is configured for the use of 7 bit SNs, and 31 if the PDCP entity is configured for the use of 5 bit SNs.

In the steps 212 and 214, if (received PDCP SN—Last_Submitted_PDCP_RX_SN) is greater than Reordering_Window or (Last_Submitted_PDCP_RX_SN−received PDCP SN) is greater than or equal to 0 and less than Reordering_Window, the process proceeds to the step 216 to check whether the received PDCP SN is greater than Next_PDCP_RX_SN or not. If the received PDCP SN is greater than Next_PDCP_RX_SN, the UE 10 shall decipher the PDCP PDU using COUNT based on (RX_HFN−1) and the received PDCP SN. If the received PDCP SN is greater than Next_PDCP_RX_SN, the UE 10 shall use COUNT based on RX_HFN and the received PDCP SN for deciphering the PDCP PDU. Then, the UE 10 shall perform header compression if configured, and discard this PDCP SDU. In the steps 212 and 214 may be reversed in order or processed in parallel.

If the steps 212 and 214 are all branched to 'No', the UE 10 checks whether (Next_PDCP_RX_SN−received PDCP SN) is greater than Reordering_Window in the step 220 or not. If (Next_PDCP_RX_SN−received PDCP SN) is greater than Reordering_Window, the UE 10 shall increment RX_HFN by 1 and use COUNT based on RX_HFN and the received PDCP SN for deciphering the PDCP PDU. As a result, the UE 10 shall use (RX_HFN+1) for deciphering the PDCP PDU. Then, the UE 10 shall set Next_PDCP_RX_SN to the (received PDCP SN+1).

If the step 220 is branched to 'No', the UE 10 checks whether (received PDCP SN—Next_PDCP_RX_SN) is greater than or equal to Reordering_Window in the step 230. If the (received PDCP SN—Next_PDCP_RX_SN) is greater than or equal to Reordering_Window, the UE 10 shall use COUNT based on (RX_HFN−1) and the received PDCP SN for deciphering the PDCP PDU.

If the step 230 is branched to 'No', the UE 10 checks whether the received PDCP SN is greater than or equal to Next_PDCP_RX_SN in the step S240. If the received PDCP SN is greater than or equal to Next_PDCP_RX_SN, the UE 10 shall use COUNT based on RX_HFN and the received PDCP SN for deciphering the PDCP PDU, and set Next_PDCP_RX_SN to the (received PDCP SN+1). If Next_PDCP_RX_SN is greater than Maximum_PDCP_SN, the UE 10 shall set Next_PDCP_RX_SN to 0, and increment RX_HFN by 1.

If the step 240 is branched to 'No', the UE 10 checks whether the received PDCP SN is less than Next_PDCP_RX_SN in the step 250 or not. If the received PDCP SN is less than Next_PDCP_RX_SN, the UE 10 shall use COUNT based on RX_HFN and the received PDCP SN for deciphering the PDCP PDU.

Figure 10:
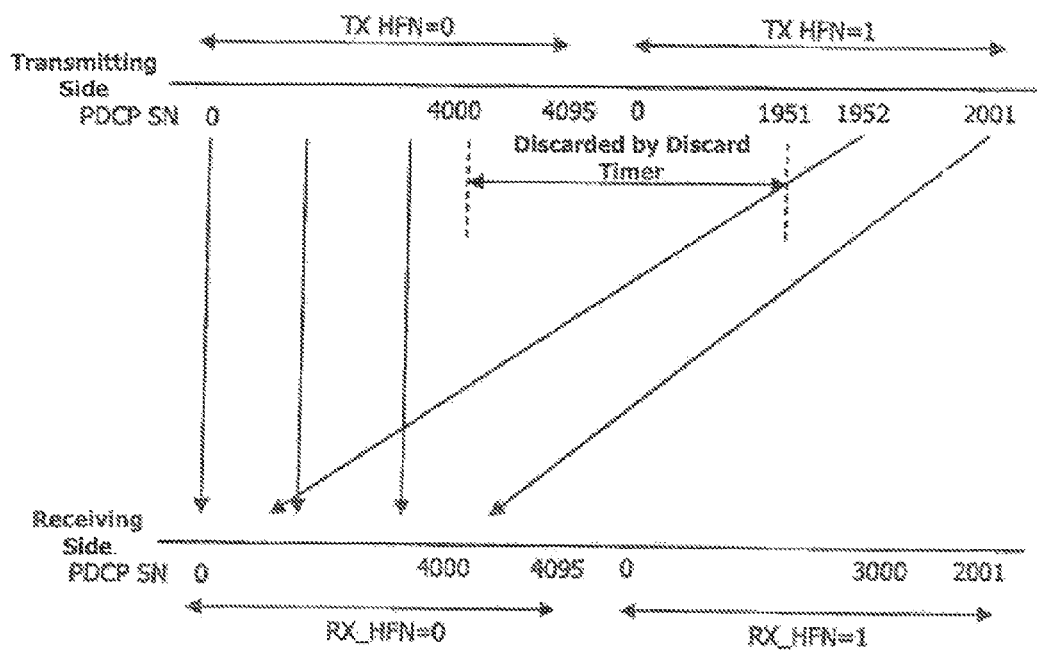
FIG. 10 is a view for explaining the problems occurring in a user data transmission/reception process according to the conventional art.

FIG. 10 is a view for explaining the problems occurring in a user data transmission/reception process according to the conventional art.

First of all, the user data transmission and reception process according to the conventional art will be described below. First, the RRC layer configures the Discard Timer of a PDCP at a point of time when a radio bearer (hereinafter, RB) is configured. Upon receipt of a Security Mode Command, the RRC layer informs the PDCP layer about supportability of the security function and an algorithm. For RBs for which the Discard Timer is to set to ms50, ms100, ms150, ms300, ms500, ms750, and ms1500, rather than to infinity, upon receipt of data from upper layers, the PDCP layer starts the Discard Timer of the corresponding data.

In the case that an ciphering algorithm other than Null is supported, the transmitting side PDCP entity generates a COUNT value as specified in 6.3.5.1 of the 36.323 PDCP Spec, and uses this COUNT value to perform ciphering and submits the PDCP PDU to lower layers. When the Discard Timer expires, the PDCP layer shall discard the corresponding PDCP PDU and PDCP SDU, including the PDCP PDU that has already been submitted to lower layers.

The receiving side PDCP entity generates a COUNT value according to 5.1.2.1.2 of the 36.323 PDCP Spec, performs deciphering, and then submits the PDCP PDU to upper layers. If ciphering is properly performed, no data loss occurs. However, if the COUNT value used for deciphering by the receiving side PDCP entity is different from the COUNT value used for ciphering by the transmitting side PDCP entity, these values are considered as invalid and discarded at the application end of the receiving side, resulting in data loss.

More specifically, if the transmitting side PDCP entity has discarded 2048 or more PDCP PDUs with sequence numbers already assigned thereto, it becomes impossible for the receiving side PDCP entity to expect the HFN of the corresponding PDCP PDU. Accordingly, an HFN mismatch occurs, and this results in an invalid deciphering result, thus causing data loss at the application end and making lost data permanently unrestorable.

FIG. 10 shows the situation after the transmitting side PDCP entity has discarded the PDCP PDU with the PDCP SN 4000 (TX_HFN=0) through the PDCP PDU with the PDCP SN 1952 (TX_HFN=1) at the transmitting side PDCP entity by the Discard Timer, assuming that Last_Submitted_PDCP_RX_SN of the receiving side PDCP entity is 3999 (RX_HFN=0) and Next_PDCP_RX_SN thereof is 4000 (RX_HFN=0).

While the transmitting side PDCP entity submits the PDCP PDUs after performing ciphering using the PDCP SN 1952 (TX_HF=1), the receiving side PDCP entity is branched to 'Yes' in the step 214 of FIG. 9 because (Last_Submitted_PDCP_RX_SN(3999)−receiving PDCP SN(1952)) is less than Reordering_Window(2048), and then branched to 'No' in the step 216 because the receiving PDCP SN (1952) is less than Next-PDCP_RX_SN(4000). As a result, the receiving side PDCP entity performs deciphering using (RX_HFN=0), and an invalid deciphering result is generated due to an HFN mismatch. In conclusion, this does not have a direct effect because the PDCP PDU is discarded.

However, assuming that this phenomenon continues and the transmitting side PDCP entity transmits the PDCP PDU with the PDCP SN 2001 (TX_HFN=1), the receiving PDCP SN (2001) of the receiving side PDCP entity is less than Next_PDCP_RX_SN(4000), and therefore the step 250 of FIG. 9 is branched to 'Yes'. As a result, the receiving side PDCP entity performs deciphering using (RX_HFN=0), and an invalid deciphering result is generated due to an HFN mismatch. In this case, data loss occurs at the application end.

Figure 11:
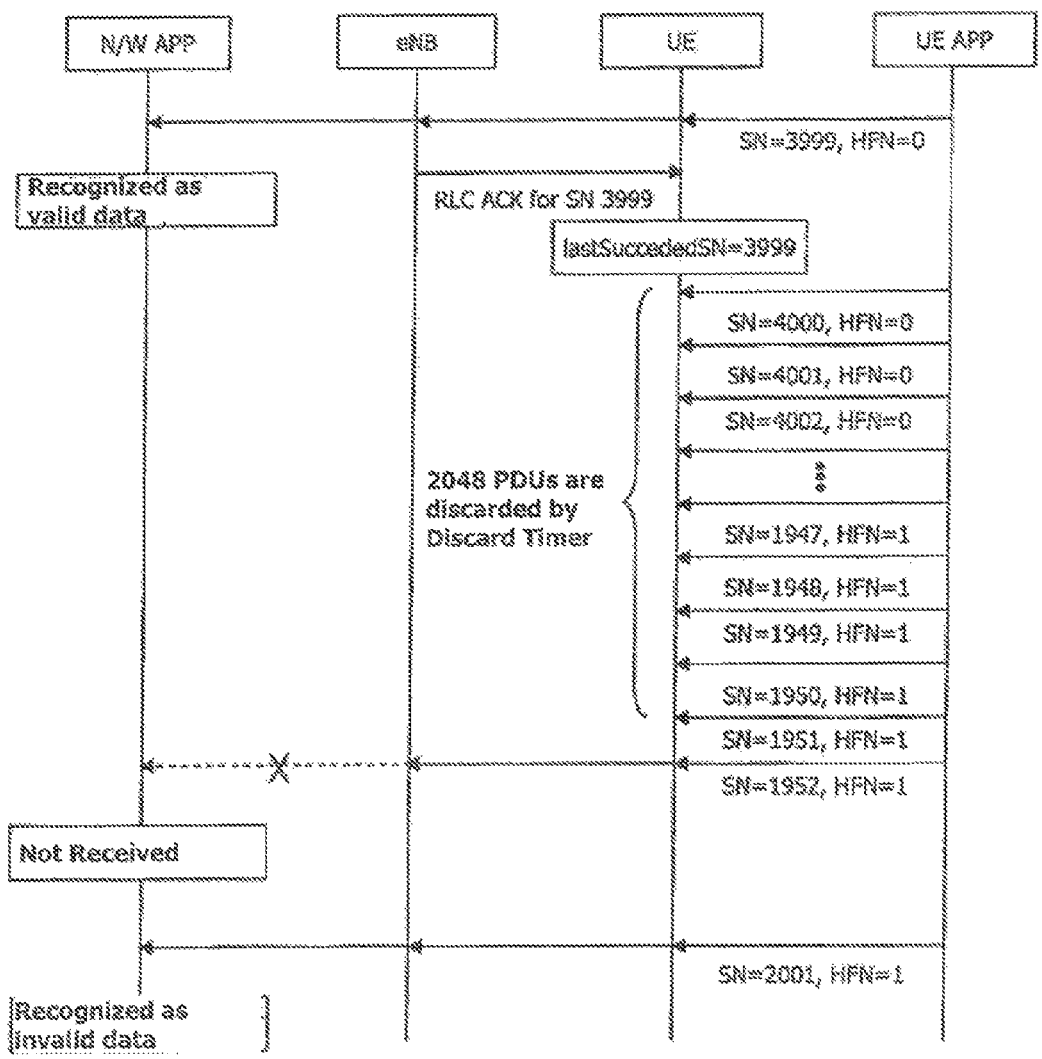
FIG. 11 is a view for schematically explaining the problems occurring in a user data transmission and reception process according to the conventional art.

FIG. 11 is a view for schematically explaining the problems occurring in a user data transmission and reception process according to the conventional art.

In FIG. 11, as described above, the PDU with the PDCP SN 3999 is transmitted from the application end of the UE 10 to an N/W application end, and Last_Submitted_PDCP_RX_SN becomes 3999 (TX_HFN=RX_HFN=0). When 2048 PDUs are discarded by the Discard Timer, the next PDU with the PDCP SN 1952 (TX_HFN=1) is deciphered at the eNB by using RX-HFN=0, and results in an invalid value, but is not transmitted from the eNB to the N/W application end (the PDCP PDU is discarded). Accordingly, this does not have a direct effect on data transmission and reception.

However, the PDU with the PDCP SN 2001 (TX_HFN=1) is deciphered at the eNB by using RX_HFN=0, and results in an invalid value, and is transmitted from the eNB to the N/W application end. Accordingly, data loss occurs.

Figure 12:
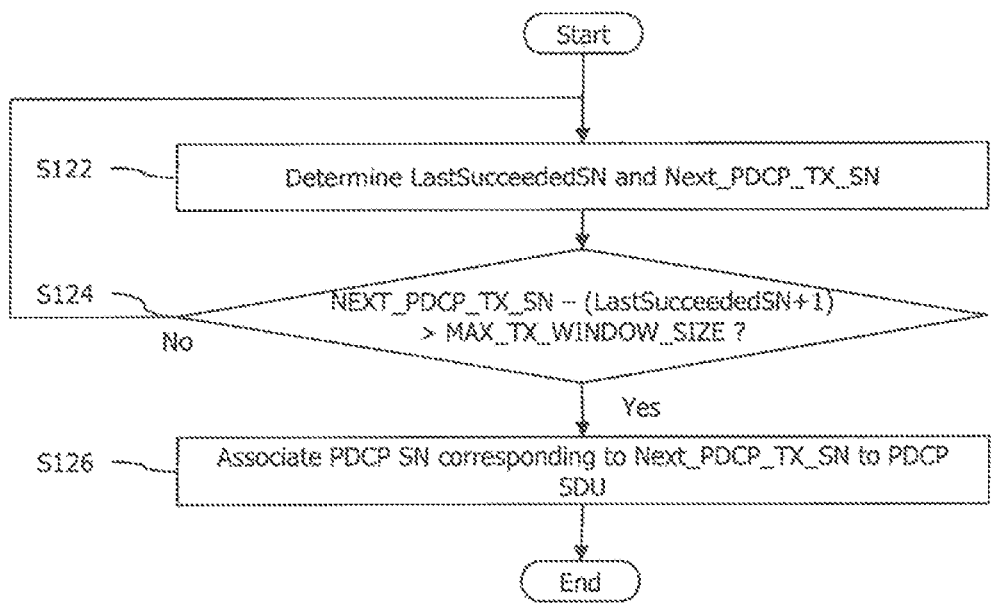
FIG. 12 is a flowchart showing in detail the step S120 of assigning a PDCP SN in the process in which the transmitting side PDCP entity transmits user data, as shown in FIG. 8.

FIG. 12 is a flowchart showing in detail the step S120 of assigning a PDCP SN in the process in which the transmitting side PDCP entity transmits user data, as shown in FIG. 8.

Hereinbelow, MAX_TX_WINDOW_SIZE indicates the number of sequence numbers that can be continuously assigned, starting from LastSucceededSN+1, in order to prevent an HFN mismatch between the receiving side PDCP entity and the transmitting side PDCP entity. MAX_TX_WINDOW_SIZE may be set to Reordering_Window-1. For example, MAX_TX_WINDOW_SIZE may be 2047.

LastSucceededSN indicates the sequence number of the largest PDCP PDU among the PDUs having completely received ACK from a Peer RLC about data transmitted from the transmitting side PDCP entity. That is, the PDUs before LastSucceededSN may be discarded by the Discard Timer, but there must be no PDUs that have been transmitted to the Peer RLC but not received ACK. Moreover, LastSucceededSN is used as a criterion for re-assigning Next_PDCP_TX_SN when the difference between LastSucceededSN+1 and Next_PDCP_TX_SN is greater than MAX_TX_WINDOW_SIZE.

In FIG. 12, the transmitting side PDCP entity determines LastSucceededSN and Next_PDCP_TX_SN using the defined criterion (S122). As described above, when the difference between LastSucceededSN+1 and Next_PDCP_TX_SN is greater than MAX_TX_WINDOW_SIZE, (SN+1) of the last PDCP PDU that has been transmitted to the Peer RLC but not successfully received ACK is determined as new Next_PDCP_TX_SN.

Next, the transmitting side PDCP entity checks whether (Next_PDCP_TX_SN−(LastSucceededSN+1)) is less than MAX_TX_WINDOW_SIZE (S124) or not. If the step 124 is branched to 'Yes', the transmitting side PDCP entity associates the PDCP SN corresponding to Next_PDCP_TX_SN to this PDCP SDU (S126). However, if the step 126 is branched to 'No', the transmitting side PDCP entity returns to the step 122 and determines LastSucceededSN and Next_PDCP_TX_SN. For example, upon receipt of new ACK about the transmitted PDCP PDU from the Peer RLC, LastSucceededSN may be changed.

Figure 13:
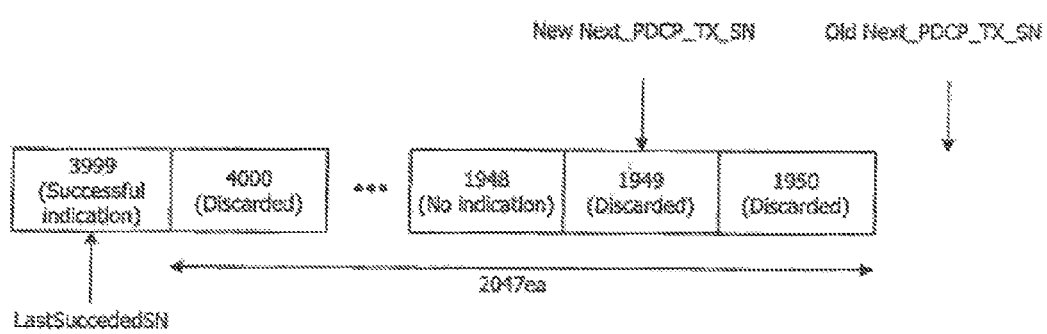
FIG. 13 is a conceptual diagram showing a process in which the transmitting side PDCP entity transmits user data according to an embodiment disclosed in this specification.

FIG. 13 is a conceptual diagram showing a process in which the transmitting side PDCP entity transmits user data according to an embodiment disclosed in this specification.

As described above, the transmitting side PDCP entity may transmit as much PDCP PDUs as MAX_TX_WINDOW_SIZE, starting from LastSucceededSN+1. If as much data as MAX_TX_WINDOW_SIZE, starting from LastSucceededSN+1, has been transmitted, but a PDCP SDU requiring SN assignment has been received from an upper layer, (SN+1) of the last PDU that has been transmitted to the Peer RLC but not successfully received ACK is designated as new Next_PDCP_T_SN and re-assigned Next_PDCP_TX_SN.

In FIG. 13, if 2047 PDCP PDUs, starting from the PDCP PDU whose PDCP SN is LastSucceededSN(3999)+1, i.e., 4000, have been transmitted to the Peer RLC, but received a new PDCP SDU from an upper layer, SN(1948)+1, which equals 1949, of the last PDCP SDU that has been transmitted to the Peer RLC but not successfully received new ACK is designated as new Next_PDCP_TX_SN. That is, Next_PDCP_TX_SN is changed from 1951 to 1949.

Figure 14:
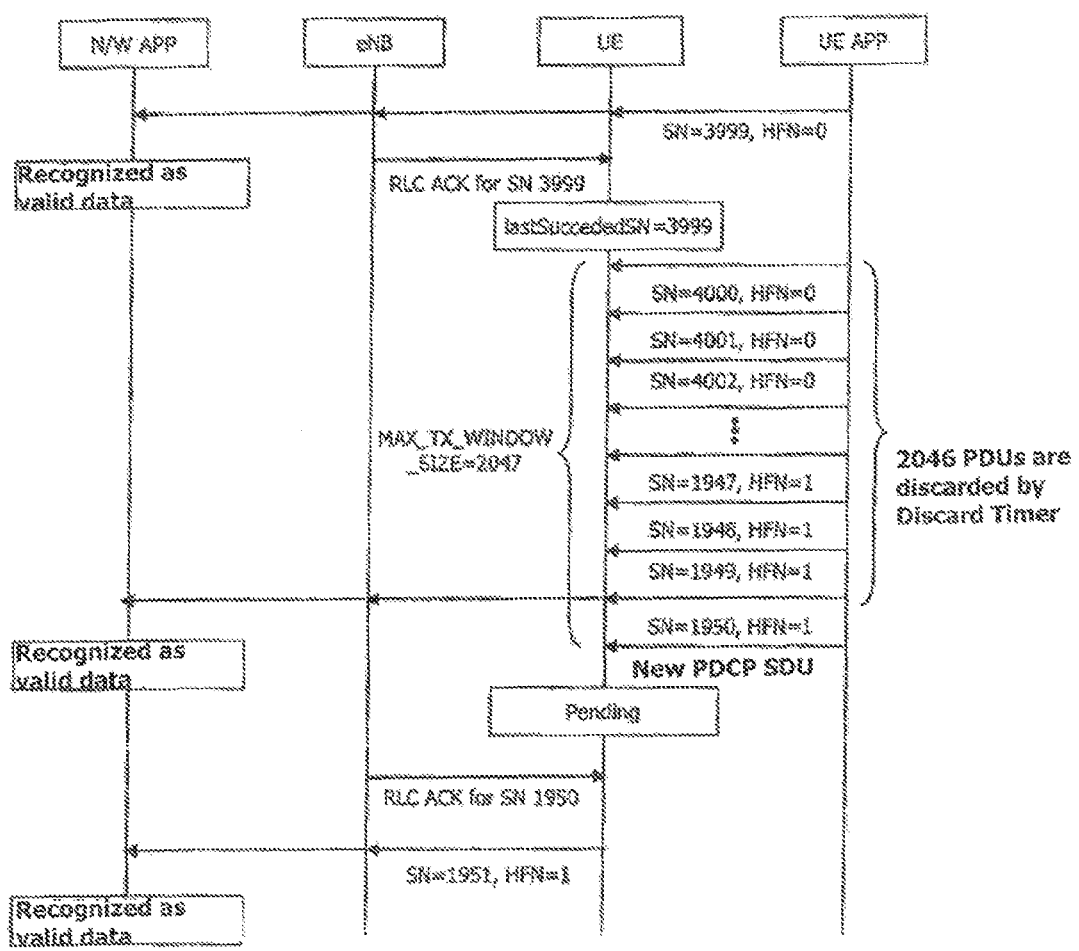
FIG. 14 is a conceptual diagram showing a process in which the transmitting side PDCP entity transmits user data according to a first embodiment disclosed in this specification.

FIG. 14 is a conceptual diagram showing a process in which the transmitting side PDCP entity transmits user data according to a first embodiment disclosed in this specification.

As the PDCP PDU with the PDCP SN 3999 has been successfully transmitted to the receiving side, the transmitting side PDCP entity receives ACK about the PDCP PDU with the PDCP SN 3999. Accordingly, LastSucceededSN is set to 3999. Subsequently, 2046 PDCP PDUs are discarded by the Discard Timer, but the PDCP PDU with the PDCP SN 1950 is transmitted to the receiving side due to the restriction on MAX_TX_WINDOW_SIZE. At this point, TX_HFN becomes 1. Because the receiving side PDCP entity is branched to 'Yes' (Next_PDCP_RX_SN(4000)−received PDCP SN(1950)>Reordering_Window(2048)) in the step 220 of FIG. 9, RH_HFN is changed from 0 to 1, and accordingly the PDCP PDU is successfully deciphered and recognized as valid data at the receiving side application end.

The transmitting side PDCP entity receives a new PDCP SDU from an upper layer. At this point, the transmitting side PDCP entity performs ciphering on the received PDCP SDU, and receives ACK about the previously transmitted PDCP PDU with the PDCP SN 1950 from the receiving side PCCP entity. Then, the PDCP PDU with the PDCP SN 1951 is transmitted to the receiving side PDCP entity. Because the step 240 of FIG. 9 is branched to 'Yes' (received PDCP SN(1951)>=Next_PDCP_RX_SN(1951)), the PDCP PDU is successfully deciphered using RX_HFN=1, and recognized as valid data at the receiving side application end.

Figure 15:
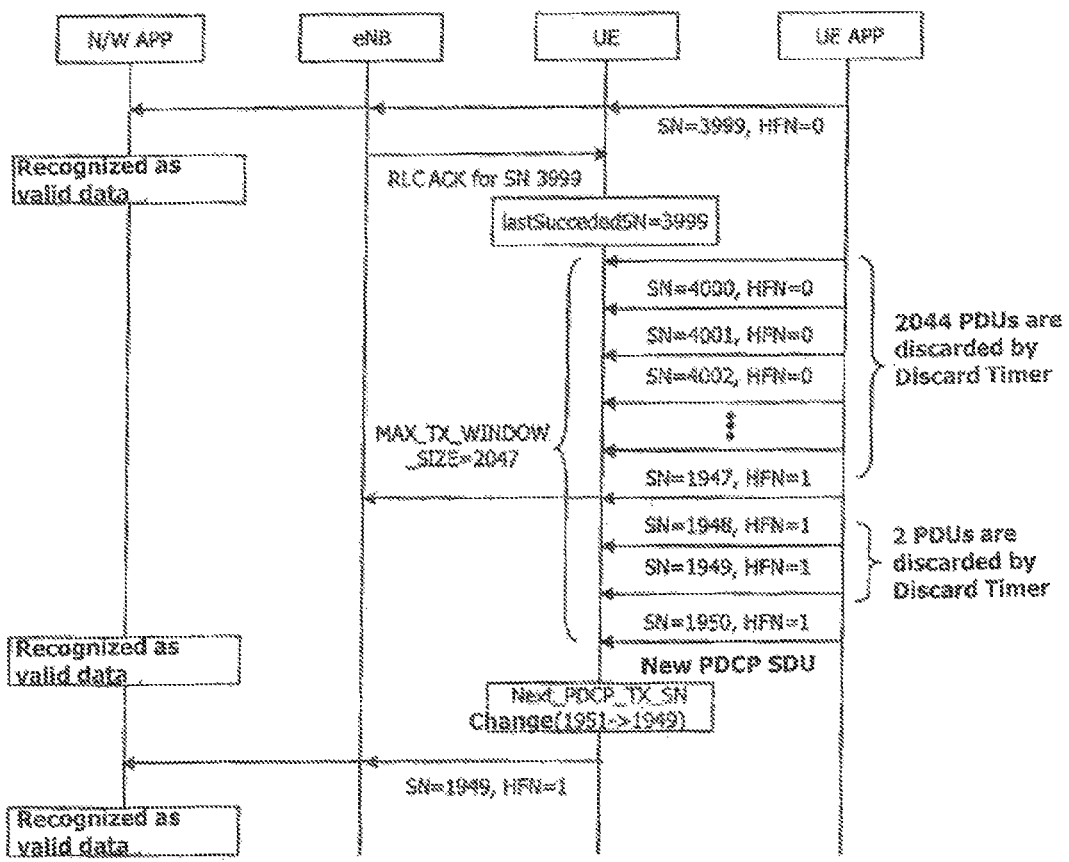
FIG. 15 is a conceptual diagram showing a process in which the transmitting side PDCP entity transmits user data according to a second embodiment disclosed in this specification.

FIG. 15 is a conceptual diagram showing a process in which the transmitting side PDCP entity transmits user data according to a second embodiment disclosed in this specification.

As the PDCP PDU with the PDCP SN 3999 has been successfully transmitted to the receiving side, the transmitting side PDCP entity receives ACK about the PDCP PDU with the PDCP SN 3999. Accordingly, LastSucceededSN is set to 3999. Subsequently, 2044 PDCP PDUs are discarded by the Discard Timer, but the PDCP PDU with the PDCP SN 1947 is transmitted to the receiving side PDCP entity. However, the transmitting side PDCP entity has not received ACK about the PDCP PDU with the PDCP SN 1947 yet. Subsequently, two PDCP PDUs are discarded by the Discard Timer, and therefore 2047 PDCP SNs, starting from LastSucceededSN+1, are assigned to the PDCP SDUs.

The transmitting side PDCP entity has to receive a new PDCP SDU from an upper layer, and assigns a new PDCP SN to the PDCP SDU. However, the PDCP SN cannot be assigned until the receipt of new ACK due to the restriction on MAX_TX_WINDOW_SIZE. In order to prevent this situation from continuing, the transmitting side PDCP entity determines (SN+1) of the last PDCP PDU (SN=1948) that has been transmitted to the Peer RLC but not successfully received ACK is determined as new Next_PDCP_TX_SN. Accordingly, Next_PDCP_TX_SN becomes 1949, and the PDCP SDU is assigned 1949 and transmitted to the receiving side PDCP entity. At this point, TX_HFN is 1. Because the receiving side PDCP entity is branched to 'Yes' (Next_PDCP_RX_SN(4000)−received PDCP SN(1949)>Reordering_Window(2048)) in the step 220 of FIG. 9, RH_HFN is changed from 0 to 1, and accordingly the PDCP PDU is successfully deciphered and recognized as valid data at the receiving side application end.

The method of the present invention explained thus far can be implemented in software, hardware, or a combination thereof. For example, the method of the present invention can be implemented as codes or commands of a software program that can be executed by a processor, and can be saved in a storage medium (e.g. memory, hard disk, etc.).

The method of the present invention may be implemented in a mobile terminal or network entity. The mobile terminal or network entity may include the protocols of FIGS. 2 to 4, as can be understood by those skilled in the art.

According to the present invention, when the Discard Timer is not set to infinity, if no radio link failure occurs, and the low signal environment continues, it is possible to prevent the discarding of 2048 or more PDCP SDUs with sequence numbers already assigned thereto by limiting the maximum number of transmission data.

Moreover, according to the present invention, upon receipt of PDCP SDUS exceeding the maximum number of transmission data from upper layers, the stopping of data transmission can be prevented by re-assigning a sequence number discarded by the Discard Timer to the next PDCP SDU.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for transmitting a Packet Data Convergence Protocol (PDCP) packet, the method comprising:
   receiving a PDCP Service Data Unit (SDU) from an upper layer;
   determining whether a Next-PDCP_TX_SN minus a sequence number of a last PDCP SDU completely and successfully transmitted from a lower layer is greater than a predetermined number that is determined based on half a PDCP sequence number space;
   associating a PDCP sequence number that corresponds to the Next-PDCP_TX_SN with the received PDCP SDU if the Next-PDCP_TX_SN minus the sequence number of the last PDCP_SDU completely and successfully transmitted from the lower layer is determined as greater than the predetermined number; and
   setting the Next-PDCP_TX_SN to a new value and associating a PDCP sequence number that corresponds to the new value with the received PDCP SDU if the Next-PDCP_TX_SN minus the sequence number of the last PDCP SDU completely and successfully transmitted from the lower layer is determined as not greater than the predetermined number.

2. The method of claim 1, wherein the new value corresponds to the sequence number of the last PDCP SDU completely and successfully transmitted from the lower layer.

3. The method of claim 1, wherein the predetermined number is based on a size of a reordering window.

4. The method of claim 1, wherein the predetermined number is 2047.

5. The method of claim 1, wherein the method is performed by a PDCP entity.

6. A wireless transmission/reception unit (WTRU) including a Packet Data Convergence Protocol (PDCP) entity, the WTRU comprising:
   a transmission standby buffer configured to store a PDCP Service Data Unit (SDU) received from an upper layer; and
   a controller configured to
   determine whether a Next-PDCP_TX_SN minus a sequence number of the last PDCP SDU completely and successfully transmitted from the lower layer is greater than a predetermined number that is determined based on half a PDCP sequence number space;
   associate a PDCP sequence number that corresponds to the Next-PDCP_TX_SN with the received PDCP SDU if the Next-PDCP_TX_SN minus the sequence number of the last PDCP SDU completely and successfully transmitted from the lower layer is determined as greater than the predetermined number; and
   set the Next-PDCP_TX_SN to a new value and associate a PDCP sequence number that corresponds to the new value with the received PDCP SDU if the Next-PDCP_TX_SN minus the sequence number of the last PDCP SDU completely and successfully transmitted from the lower layer is determined as not greater than the predetermined number.

7. The wireless transmission/reception unit of claim 6, wherein the new value corresponds to the sequence number of the last PDCP SDU completely and successfully transmitted from the lower layer.

8. The wireless transmission/reception unit of claim 6, wherein the predetermined number is based on a size of a reordering window.

9. The WTRU entity of claim 6, wherein the predetermined number is 2047.

10. The WTRU entity of claim 6, wherein the controller is a PDCP entity.

* * * * *